United States Patent
Sultenfuss et al.

(10) Patent No.: US 10,811,895 B2
(45) Date of Patent: Oct. 20, 2020

(54) WIRELESS CHARGING WITH POWER FLUX BOOST IN AN INFORMATION HANDLING SYSTEM

(71) Applicant: Dell Products, L.P., Round Rock, TX (US)

(72) Inventors: Andrew Thomas Sultenfuss, Leander, TX (US); Mitch Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 445 days.

(21) Appl. No.: 15/658,520

(22) Filed: Jul. 25, 2017

(65) Prior Publication Data
US 2019/0036367 A1 Jan. 31, 2019

(51) Int. Cl.
| | |
|---|---|
| H02J 7/02 | (2016.01) |
| H02J 7/00 | (2006.01) |
| G06F 1/26 | (2006.01) |
| G06F 1/3287 | (2019.01) |
| G06F 1/3296 | (2019.01) |
| H04B 5/00 | (2006.01) |
| H02J 50/80 | (2016.01) |
| H02J 50/10 | (2016.01) |

(52) U.S. Cl.
CPC .......... *H02J 7/025* (2013.01); *G06F 1/26* (2013.01); *G06F 1/266* (2013.01); *G06F 1/3287* (2013.01); *G06F 1/3296* (2013.01); *H02J 7/007* (2013.01); *H02J 50/80* (2016.02); *H04B 5/0037* (2013.01); *H02J 50/10* (2016.02)

(58) Field of Classification Search
None
See application file for complete search history.

(56) References Cited

U.S. PATENT DOCUMENTS

| | | | |
|---|---|---|---|
| 6,885,155 B2 | 4/2005 | Speirs et al. | |
| 2012/0153856 A1 | 6/2012 | Liu et al. | |
| 2013/0020951 A1 | 1/2013 | Pollock et al. | |
| 2013/0311798 A1* | 11/2013 | Sultenfuss | H02J 7/025 713/310 |
| 2016/0329751 A1* | 11/2016 | Mach | H02J 7/025 |
| 2017/0040810 A1* | 2/2017 | Hu | H02J 7/0036 |

* cited by examiner

*Primary Examiner* — Robert Grant
*Assistant Examiner* — Tynese V McDaniel
(74) *Attorney, Agent, or Firm* — Fogarty LLP

(57) ABSTRACT

A battery architecture for wireless charging with optimized wireless power flux boost and load point efficiency in an information handling system (IHS) is described. In some embodiments, an IHS may include an embedded controller (EC) and a memory coupled to the EC, the memory having program instructions stored thereon that, upon execution, cause the EC to: determine a first characteristic of a charging pad configured to provide wireless power to a charger coupled to a battery of the IHS, and select, based upon the first characteristic, a first scalar value applied to a voltage multiplier of the charging pad.

19 Claims, 8 Drawing Sheets

WIRELESS CHARGING WITH POWER FLUX BOOST IN AN INFORMATION HANDLING SYSTEM

FIELD

The present disclosure generally relates to information handling systems, and, more particularly, to systems and methods for optimized wireless power flux boost and load point efficiency in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A wireless power delivery system typically includes a wireless charging pad upon which an IHS may be placed for charging. The IHS may communicate with the pad to indicate that the IHS available to receive power. The wireless power delivery system may then wirelessly transmit power to the IHS, for example, to charge an internal battery of the IHS.

SUMMARY

Embodiments of systems and methods for optimized wireless power flux boost and load point efficiency in an information handling system (IHS) are described. In an illustrative, non-limiting embodiment, an IHS may include an embedded controller (EC) and a memory coupled to the EC, the memory having program instructions stored thereon that, upon execution, cause the EC to: determine a first characteristic of a charging pad configured to provide wireless power to a charger coupled to a battery of the IHS, and select, based upon the first characteristic, a first scalar value applied to a voltage multiplier of the charging pad.

In some implementations, to determine the first characteristic, the program instructions, upon execution, may cause the EC to identify the charging pad. For example, the first characteristic may include a minimum or maximum amount of power deliverable by the charging pad, such that the first scalar value may be selected to reduce a power mismatch between the charging pad and the charger. Additionally or alternatively, the program instructions, upon execution, may cause the EC to select a second scalar value applied to a voltage divider of the charger, such that the second scalar value may be the inverse of the first scalar value.

The program instructions, upon execution, may also cause the EC to determine a third characteristic of the battery, such that the first and second scalars may be selected based upon the first, second, and third characteristics. For example, the third characteristic may be a charge level, a charge rate, or a discharge rate. Additionally or alternatively, the program instructions, upon execution, may cause the EC to determine a fourth characteristic of a load within the IHS, such that the first and second scalars may be selected based upon the first, second, third, and fourth characteristics. For example, the fourth characteristic may include an operating state of the load.

In another illustrative, non-limiting embodiment, a method may implement one or more of the aforementioned operations. In yet another illustrative, non-limiting embodiment, a hardware memory storage device may have program instructions stored thereon that, upon execution by an IHS, configure and/or cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
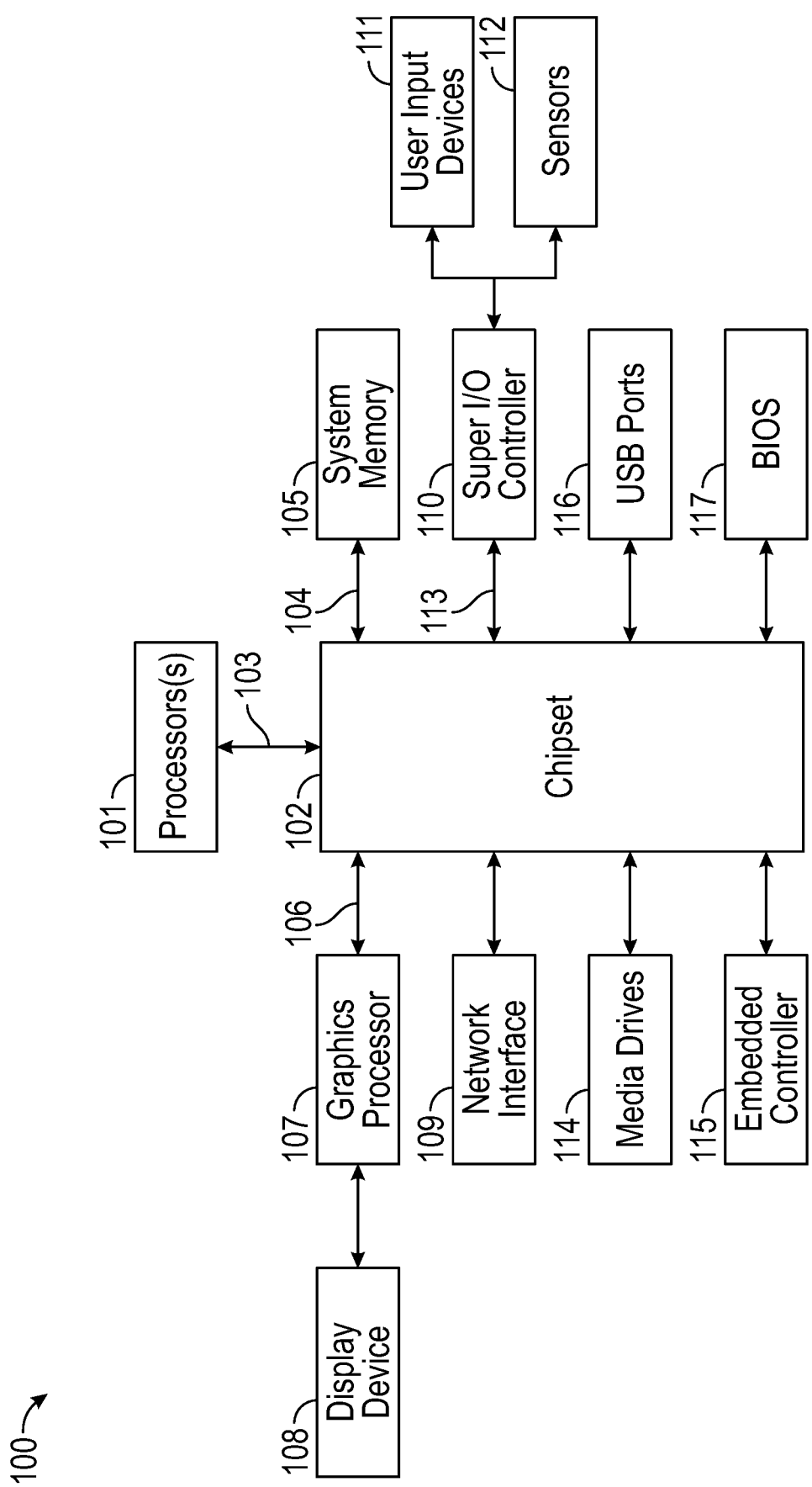
FIG. 1 is a block diagram of a non-limiting example of an information handling system according to some embodiments.

FIG. 1 is a block diagram of a non-limiting example of IHS 100. In various embodiments, systems and methods for wireless charging with optimized wireless power flux boost and load point efficiency, as described herein, may be implemented in IHS 100. As shown, IHS 100 may include one or more processors 101. In various embodiments, IHS 100 may be a single-processor system including one processor 101, or a multi-processor system including two or more processors 101. Processor(s) 101 may include any processor capable of executing program instructions, such as any general-purpose or embedded processors implementing any of a variety of Instruction Set Architectures (ISAs).

IHS 100 includes chipset 102 having one or more integrated circuits coupled to processor(s) 101. In certain implementations, chipset 102 utilizes a QPI (QuickPath Interconnect) bus 103 for communicating with processor(s) 101. Chipset 102 provides processor(s) 101 with access to a variety of resources. For instance, chipset 102 provides access to system memory 105 over memory bus 104. System memory 105 may be configured to store program instructions executable by, and/or data accessible to, processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to Graphics Processing Unit (GPU) 107. In certain embodiments, graphics processor 107 may be disposed within one or more video or graphics cards that have been installed as components of the IHS 100. Graphics processor 107 may be coupled to chipset 102 via graphics bus 106 such as provided by an AGP (Accelerated Graphics Port) bus or a PCIe (Peripheral Component Interconnect Express) bus.

In certain embodiments, chipset 102 may provide access to one or more user input devices 111. In those cases, chipset 102 may be coupled to a super I/O controller 110 that provides interfaces for a variety of user input devices 111, in particular lower bandwidth and low data rate devices.

For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. These I/O devices may interface with super I/O controller 110 through wired or wireless connections. In certain embodiments, chipset 102 may be coupled to super I/O controller 110 via Low Pin Count (LPC) bus 113.

Other resources may also be coupled to the processor(s) 101 of IHS 100 through chipset 102. In certain embodiments, chipset 102 may be coupled to network interface 109, such as provided by a Network Interface Controller (NIC) coupled to IHS 100. For example, network interface 109 may be coupled to chipset 102 via PCIe bus 112. According to various embodiments, network interface 109 may also support communication over various wired and/or wireless networks and protocols (e.g., WiGig, Wi-Fi, Bluetooth, etc.).

In certain embodiments, chipset 102 may provide access to one or more Universal Serial Bus (USB) ports 116. Chipset 102 may further provide access to other types of storage devices. For instance, IHS 100 may utilize media drives 114, such as magnetic disk storage drives, optical drives, solid state drives, or removable-media drives.

Upon powering or restarting IHS 100, processor(s) 101 may utilize instructions stored in Basic Input/Output System (BIOS) or Unified Extensible Firmware Interface (UEFI) chip or firmware 117 to initialize and test hardware components coupled to the IHS 100 and to load an Operating System (OS) for use by IHS 100. Generally speaking, BIOS 117 provides an abstraction layer that allows the OS to interface with certain hardware components that utilized by IHS 100. It is through this hardware abstraction layer that software executed by the processor(s) 101 of IHS 100 is able to interface with I/O devices that coupled to IHS 100.

Chipset 102 also provides access to embedded controller (EC) 115. EC 115 is a microcontroller that handles various system tasks, including tasks that the Operating System (OS) executed by processor(s) 101 does not handle. Typically, EC 101 is kept "always-on."

EC 115 may communicate with chipset 102, GPU 107, and/or processor(s) 101, using any suitable form of communication, including the Advanced Configuration and Power Interface (ACPI), System Management Bus (SM-Bus), or shared memory. In various implementations, EC 115 may have its own RAM (independent of system memory 105) and its own flash ROM, on which firmware is stored. The EC's firmware includes program instructions that, upon execution by EC 115, cause EC 115 to perform a number of operations for buck-boost conversion in IHS 100, as described in more detail below.

In various embodiments, IHS 100 may include various components in addition to those that are shown. For example, IHS 100 may include a power system with one or more power buses or voltage rails configured to provide electrical power to one or more of components 101-117. Each bus or rail may be coupled to a respective subsystem or power plane, and each subsystem may encompass a subset of one or more of components 101-117.

For example, a first subsystem may include a low-voltage load, such as processor(s) 101, and a second subsystem may include a high-voltage load, such as display 108 (e.g., a high-definition (HD) monitor or high-dynamic range (HDR) liquid crystal display (LCD) with a backlight). In this case, the voltage received by the first subsystem may range from approximately 1 to 5 V, while the second subsystem may require 20 to 200 V or more.

Traditional IHS design requires selecting either the low-voltage or the high-voltage subsystem for power delivery optimization. In contrast, the various systems and methods described herein may satisfy dissimilar power needs from various IHS subsystems using the same range multiplier buck-boost topology for varying load points. As such, these systems and methods may provide a "right size" $V_{in}$ architecture that yields system-wide optimized power, as $V_{in}$ (e.g., the voltage provided to a voltage regulator within a subsystem) is specifically mated for each subsystem or component.

In some cases, a power system as described herein may create a $V_{in}$ range that is near the target value or power specifications for a given subsystem(s). As such, the power system may reduce battery conversion loss to 2% per optimized voltage range. These ranges are flat within the multiplier/divisor, and only reflect battery/cell voltage decline range effects (6-8 V=12-16 V, as an example), providing a battery topology much improved over direct drive.

In some embodiments, IHS 100 may not include all of the components shown in FIG. 1. Moreover, some components that are represented as separate components in FIG. 1 may be integrated with other components. For example, in various implementations, all or a portion of the functionality provided by the illustrated components may instead be provided by components integrated into the one or more processor(s) 101 as a system-on-a-chip (SOC) or the like.

Figure 2:
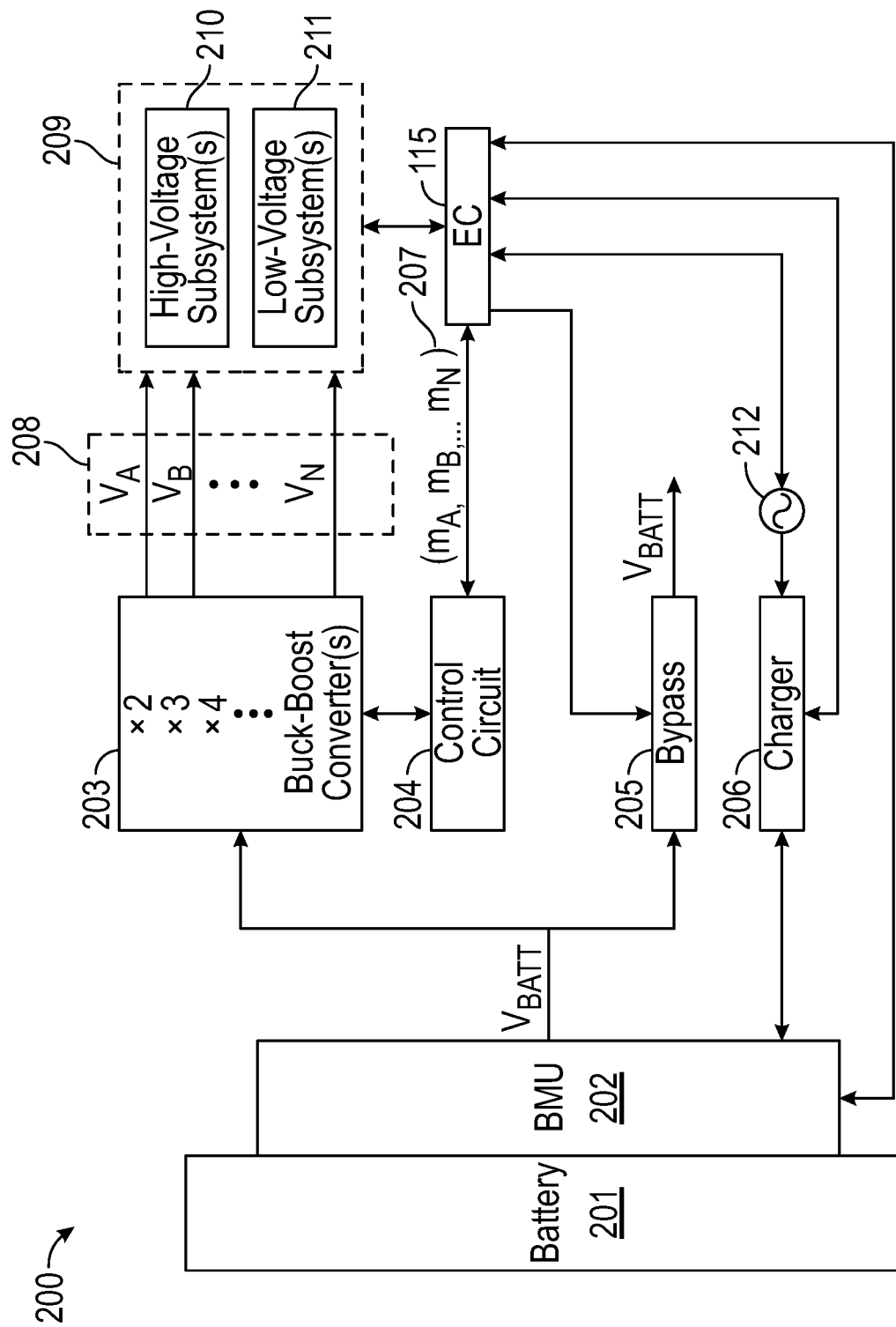
FIG. 2 is a block diagram of a non-limiting example of a power system for buck-boost conversion in an information handling system according to some embodiments.

FIG. 2 is a block diagram of a non-limiting example of power system 200 for buck-boost conversion in IHS 100. As shown, EC 115 is coupled to battery management unit (BMU) 202 of battery 201, charger or DC source 206, bypass circuit 205, AC source 212, control circuit 204 of buck-boost converter 203, and/or other components 209 of IHS 100, including high-voltage subsystem(s) 210 and low-voltage subsystem(s) 211. In various embodiments, EC 115 may be coupled to one or more of the aforementioned elements via chipset 102.

Battery 201 may include one or more cells or cell assemblies. A "cell" is an electrochemical unit that contains electrode(s), separator(s), and/or electrolyte(s). In its simplest form, battery 201 may have a single cell. In many cases, however, battery 201 may multiple cells coupled to each other in series and/or parallel configuration. For instance, battery 201 may have four 3.6 V Lithium-Ion (Li-Ion) or Lithium-Ion Polymer (Li-Polymer) cells coupled in series to achieve a nominal voltage 14.4 V, and two additional batteries coupled in parallel to boost the capacity from 2,400 mAh to 4,800 mAh (incidentally, this particular configuration is referred to as "4s2p," meaning there are four cells in series and two in parallel).

BMU 202 may implement any suitable battery or power supply management system, and it may include a controller, memory, and/or program instructions stored in the memory. The output rail of BMU 202 provides $V_{BATT}$. In operation, BMU 202 may execute its instructions to perform operations such as load balancing, under-voltage monitoring, over-voltage monitoring, safety monitoring, over-temperature monitoring, etc. BMU 202 may also detect whether battery 201 is in charge or discharge mode.

Buck-boost converter 203 may be a DC-to-DC converter that has an output voltage magnitude that is either greater than (boost) or less than (buck) the input voltage. In various implementations, converter 203 may include a switched-mode power supply (SMPS) containing at least two semiconductors (e.g., a diode and a transistor), and at least one energy storage element—a capacitor and/or an inductor. In some cases, converter 203 may include a number of energy storage elements in series, such that nodes between those elements may be used as output terminals. These terminals may be selectively tapped, using switches or the like, to yield a corresponding output voltage that is an integer multiple (or a fraction) of the input voltage.

In some cases, buck-boost converter 203 may have two or more stages. Additionally or alternatively, buck-boost converter 203 may be configured to provide two or more independent voltage conversion rails or channels 208, each feeding a different power bus with a different voltage 208 ($V_A$, $V_B$, $V_N$). For example, a multi-channel buck-boost converter and/or an array of buck-boost converters may be used.

Control circuit 204 includes one or more logic circuits configured to receive a scalar value 207 (e.g., m) from EC 115, and to control one or more switches of buck-boost converter 203 in order to yield an output voltage 208 equal to $V_{BATT} \times M$. When a multi-channel buck-boost converter 203 is used, each of scalar values 207 ($m_A$, $m_B$, $m_C$, . . . ) may be applied to a corresponding rail to yield one of output voltages 208 ($V_A$, $V_B$, $V_N$, . . . ), each voltage 208 being a different multiple (or fraction) of $V_{BATT}$. Voltage rail(s) 208 may then be coupled to system 209 and/or to one or more subsystems 210 and 211.

Bypass circuit 205 may include circuitry to bypass buck-boost converter 203 and provide $V_{BATT}$ to any given load. Additionally or alternatively, the value of m applied by buck-boost converter 203 may be selected as "0" or "1", such that output voltage 208 has the same value as $V_{BATT}$.

Charger or DC source 206 may be a power supply unit (PSU), a wall charger, an induction charger, etc. AC source 212 may be any suitable alternating current power source (e.g., provided via an electrical outlet or socket).

System 209 may be IHS 100. High-voltage subsystem 210 may include one or more IHS components 101-117 that operate with a high voltage level (e.g., higher than $V_{BATT}$) and/or at a high-power plane. In some cases, high-voltage subsystem 210 may require a voltage rail of up to 200 V (e.g., a backlit HDR display 108). Conversely, low-voltage subsystem 210 may include one or more IHS components that operate with a low voltage level (e.g., lower than $V_{BATT}$) and/or at a low-power plane. In some cases, low-voltage subsystem 211 may require a voltage rail of down to 1 V (e.g., a processor 101). Generally, each of high-voltage subsystem 210 and low-voltage subsystem 211 may receive a respective unregulated voltage 208, and therefore may include its own voltage regulator.

In operation, system 200 may perform automatic, autonomous, programmatic, on-demand, real-time, and/or dynamic buck-boost conversion in IHS 100. For example, EC 115 may determine a characteristic of high-voltage subsystem 210 and/or low-voltage subsystem 211, and it may control buck-boost converter 203 to modify a voltage (e.g., $V_{BATT}$) provided to subsystem(s) 210 and/or 211 by a power source (e.g., battery 201) based, at least in part, upon the identified characteristic.

For example, EC 115 may identify high-voltage subsystem 210, low-voltage subsystem 211, and/or battery 201 by retrieving a power resource specification of that subsystem from an Advanced Configuration and Power Interface (ACPI) table. Additionally or alternatively, EC 115 may perform an electrical characterization of high-voltage subsystem 210, low-voltage subsystem 211, battery 201, and/or component(s) thereof.

Based upon a comparison between $V_{BATT}$ and the voltage needed by the identified subsystem, EC 115 may calculate suitable m values. For example, if $V_{BATT}$ is 6 V and the power requirement of high-voltage subsystem is 24 V, m would be equal to 4. When the power requirement is a range (e.g., between 18 and 22 V), m may be selected to provide an output voltage value 208 falling within that range (e.g., 20 V). Moreover, when the power requirement of the subsystem is not an integer multiple of $V_{BATT}$ $V_{BATT}$ is 6 V and the subsystem requires a 15 V rail), m may be selected to be below or above that value (e.g., m=2 or 3, respectively), depending upon that subsystem's voltage regulator characteristics (e.g., whether better performance with either under or over-voltage at its input terminals).

In some cases, EC 115 may be coupled to processor(s) 101 and/or GPU 107, for example, via chipset 102. Additionally or alternatively, EC 115 may be coupled directly to subsystem(s) 210 and/or 211.

As such, EC 115 may dynamically change the value of m. For example, EC 115 receive a notification that subsystem(s) 210 and/or 211 have changed from a first operating state to a second operating state, and may control buck-boost converter 203 to adjust voltage 208 in response to the change, during operation of IHS 100, typically without the need for a reboot.

For instance, low-voltage subsystem 211 may include processor 101, the first operating state may be a turbo state, and the second operating state may be a non-turbo state. In this case, processor 101 may require a higher voltage when operating in the first operating state than in the second operating state, and therefore the value of m selected during the first operating state may be larger than the value of m selected during the second operating state.

Additionally or alternatively, high-voltage subsystem 210 may include a backlit display 108, the first operating state may be a high-dynamic range (HDR) state, and the second operating state may be a non-HDR state. In this case, display 108 may also require a higher voltage when operating in the first operating state than in the second operating state, and therefore the value of m selected during the first operating state may be larger than the value of m selected during the second operating state.

Additionally or alternatively, EC 115 may receive a notification that the power source (e.g., battery 201) has changed from a first state to a second state, and it may control buck-boost converter 203 to modify output voltage 208 by selecting a value of m based upon the change. For example, in first state the power source may provide an amount of electrical power below a threshold (e.g., battery 201 is discharged), and, in the second state, the power source may provide an amount of electrical power above the threshold (e.g., battery 201 is charged). Therefore, the value of m selected during the first operating state may be larger than the value of m selected during the second operating state.

Figure 3:
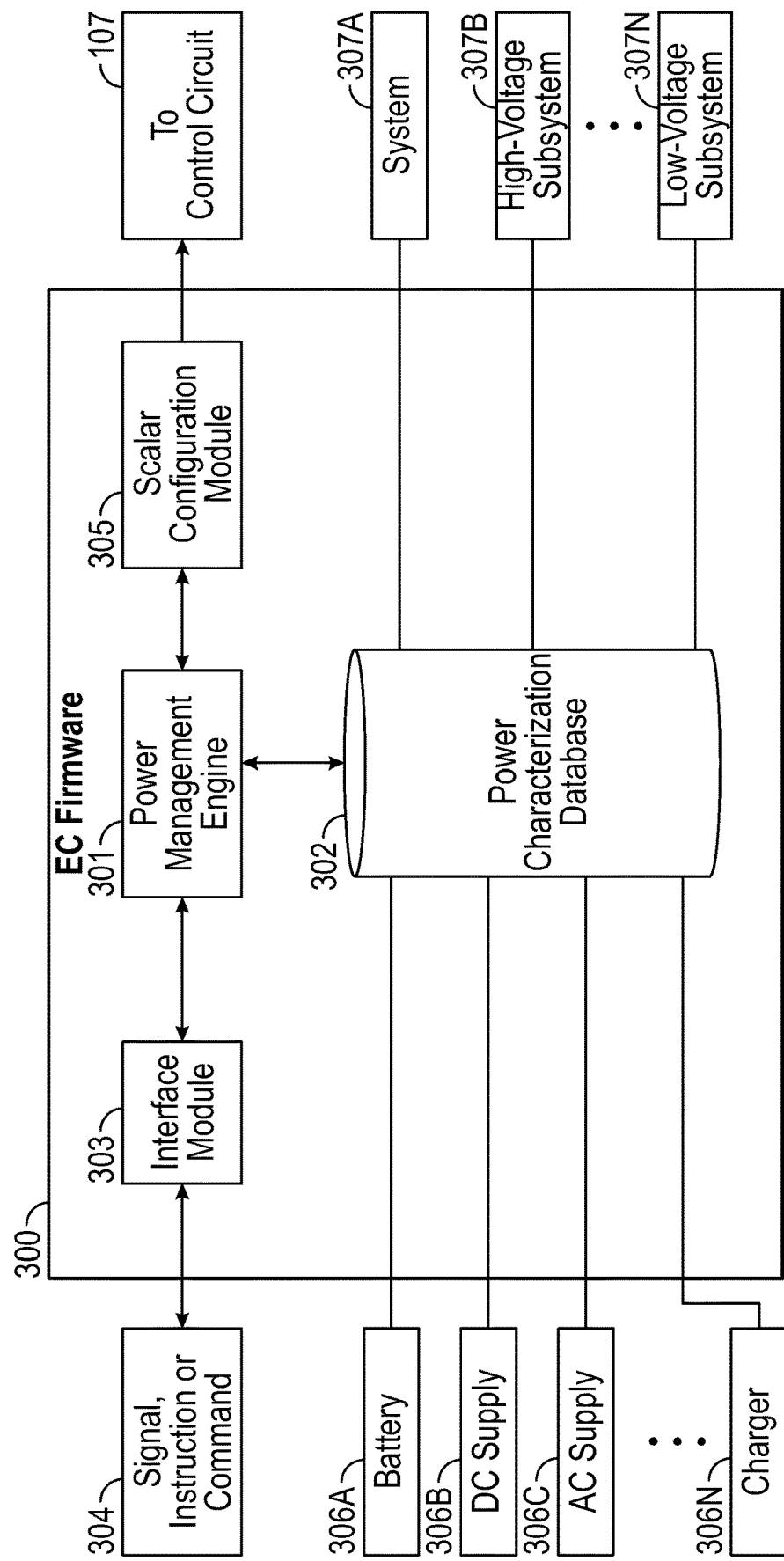
FIG. 3 is a block diagram of a non-limiting example of embedded controller firmware according to some embodiments.

FIG. 3 is a block diagram of a non-limiting example of EC firmware components 300. In some embodiments, program instructions implementing firmware 300 may be executed by EC 115 to perform one or more operations for buck-boost conversion in IHS 100.

As shown, EC firmware 300 includes power management engine 301 coupled to interface module 303 and to scalar configuration module 305. Interface module 303 may be configured to transmit and/or receive any suitable signal, instruction, or command 304 to/from any of a number of components of IHS 100. For example, interface module 303 may be configured to communicate with high-voltage subsystem 210 and/or low-voltage subsystem 211, processor(s) 101, GPU 107, USB ports 116, media drives 114, and/or BIOS 117, for example, using ACPI or SMBus protocols or techniques.

In some cases power management engine 301 may query subsystem(s) 210 and/or 211 for identification information (e.g., SKU, EDID, UID, model number, version, etc.) using interface module 303. Additionally or alternatively, subsystem(s) 210 and/or 211 may provide identification information to power management engine 301 using interface module 303. Additionally or alternatively, power management engine 301 may perform electrical characterization operations upon subsystem(s) 210 and/or 211 via interface module 303.

Power management engine 301 may be configured to receive or generate subsystem identification and/or power characterization information, and to determine a suitable voltage value to be provided to each respective subsystem, for example, from ACPI table(s).

In some cases, a Differentiated Definition Block may describe each device, component, or subsystem handled by ACPI, including a description of what power resources (power planes and/or clock sources) a subsystem needs in each power and/or operating state that the subsystem supports (e.g., a given IHS subsystem may require a high power bus and a clock in the a higher-power state, but only a low-power bus and no clock in a lower-power state). The ACPI table(s) may also list the power planes and clock sources themselves, and control methods for turning them on and off.

The result of the identification and/or characterization operation(s) performed by power management engine 301 may be stored and/or retrieved from/to database 302. As such, database 302 may include any of the aforementioned information for power sources 306A-N (e.g., battery, DC supply, AC supply, charger, etc.), as well as electrical loads 307 (e.g., entire IHS 209, high-voltage subsystem 210, low-voltage subsystem 211, etc.). In some cases, more than one of the same type of source may be present—e.g., two or more batteries.

For each subsystem in its present operating state, power management engine 301 may compare output voltage(s) natively provided by battery 201 against the voltage requirements for that subsystem in that state and at that time. The value of m may be directly or inversely proportional to a ratio between these two voltages or voltage ranges.

Scalar configuration module 305 is configured to switch storage elements on or off within buck-boost converter 203 via control circuit 207 to implement the calculated value of m 207 and to apply that value to $V_{BATT}$, thereby providing output voltage 208.

Figure 4:
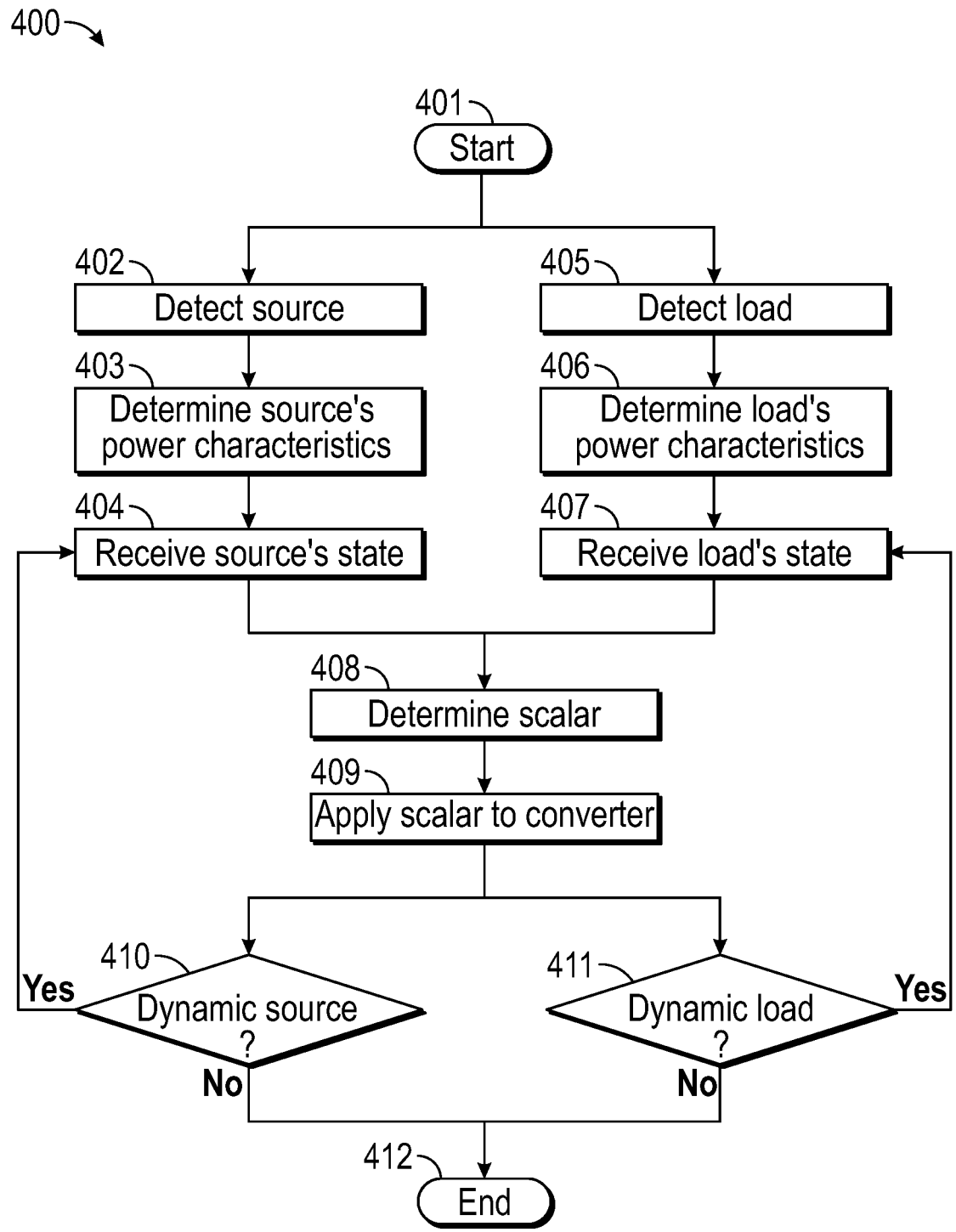
FIG. 4 is a flowchart of a non-limiting example of a method for buck-boost conversion in an information handling system according to some embodiments.

FIG. 4 is a flowchart of a non-limiting example of method 400 for buck-boost conversion. In some embodiments, method 400 starts at block 401 and it may be implemented at least in part through the execution of one or more firmware component(s) 300 by EC 115. At blocks 402 and 405, method 400 may detect a power source 306 and/or load 307 coupled to IHS 100, respectively, for example, based upon information retrieved from an ACPI table or the like. Additionally or alternatively, power sources 30A-N and subsystems 307A-N may be identified.

Particularly, each of power sources 306A-N and subsystems 307A-N may be coupled to a respective power connector, and IHS 100 may detect those connections. In an embodiment, each of power sources 306A-N and subsystems 307A-N may be connected to IHS 100 via a single connector. In another embodiment, however, any of power sources 306A-N or subsystems 307A-N may be connected to IHS 100 using various connectors at the same time.

To identify one or more of power sources 306A-N or subsystems 307A-N at blocks 402 and 405, analog circuitry may be employed to detect and enable each entity. One or more of power sources 306A-N may be "smart" entities that, along with power, provides the source's identity and/or characteristics about the power such as nominal and minimum voltage, maximum current, and/or a variety of other power characteristics. In another example, one or more of the power sources may be "dumb" or legacy source that simply provides power, and method 400 may analyze that power to determine one or more power characteristics such as nominal and minimum voltage, maximum current, etc. Additionally or alternatively, power characteristics may be stored in database 302.

In some cases, at blocks 402 and 405, method 400 may also determine that the power source(s), subsystems 307A-N, and/or IHS 100 are compatible with one another and/or properly configured to use power system 200. The remainder of method 400 assumes that components have successfully negotiated a connection and/or performed a handshake operation. If the handshake fails and/or if a given component rejects another, method 400 may end at block 412. Additionally or alternatively, if one of sources 306A-N is identified and the load(s) are not, operations 405-407 may be skipped. Additionally or alternatively, if one of loads 307A-N is identified and the source(s) are not, operations 402-404 may be skipped.

At blocks 403 and 406, method 400 may detect power characteristics of power source 306A-N and/or loads 307A-N, respectively. For example, blocks 403 and 406 may retrieve power information from an ACPI table or the like.

Alternatively, a plurality of charging characteristics may be determined for battery 201. In some embodiments, block 403 may determine the battery charge level and select a plurality of charging rates for battery 201 that include a minimum charge rate, a maximum charge rate, and/or a plurality of intermediate charge rates between the minimum charge rate and the maximum charge rate. The charging process may include many factors that can impact battery life, and block 403 is operable to consider power source capability, battery charge level, and operation power requirements of system components in determining the charge rate.

Block 403 may retrieve from battery 201, or from database 203, a plurality of battery characteristics that include battery type (e.g., lithium ion, lithium polymer, etc.), battery capacity, and/or a variety of battery characteristics (e.g., number of cells, output rails, etc.). For example, a charge rate desirable for a given battery may require more power than can be provided by a particular power source under desired operation levels of other system components, while a more capable power source may support the optimum charge rate, and the system allows for the characterizations of those variable in determining the charge rate to be supplied to a battery.

In an embodiment, the power characteristics may be for power provided from a single power input. In another embodiment, the power characteristics may be for a total power provided from a plurality of power inputs (e.g., the power characteristics may be determined for a total power provided from a plurality of different power inputs that each provides a discrete power source for IHS 100). In another embodiment, the power characteristics may be power characteristics for power provided from each of a plurality of power inputs (e.g., power characteristics may be determined for each of a plurality of discrete power sources provided from respective power inputs connected to the IHS 100) in order, for example, to select the highest power and/or the optimal power source for IHS 100.

At block 406, a plurality of operation characteristics may be determined for subsystems 210 and/or 211 in IHS 100. Block 406 may determine a plurality of operating levels for subsystems 210 and/or 211 that include a minimum operation level, and maximum operation level, and/or a plurality of intermediate operation levels between the minimum operation level and the maximum operation level. In an embodiment, the determination of operating characteristics for certain processors may include capping their operating power states (P-states) or disabling a "turbo-mode."

Additionally or alternatively, block 406 may retrieve from subsystems 210 and/or 211, or from database 203, a plurality of component characteristics that include, for example, power consumption for processor operating states, memory technology type (e.g., low power, standard, etc.), storage technology type (e.g., solid state, hard disk drive (HDD), etc.), and/or a variety of other component characteristics. Block 406 may then use the component characteristics with the power input characteristics to determine the operation characteristics.

In an embodiment, the operation characteristics may be determined for system 209 operating together. In another embodiment, operation characteristics may be determined for each of subsystems 210 and/or 211 individually.

At blocks 404 and 407, method 400 may identify the source's state and/or the load's state (e.g., number of cells, charge level, turbo, HDR, etc.). In some cases, the source and/or load may operate in a single state, and therefore blocks 404 and/or 405 may be performed only once, or may be skipped altogether.

At block 408, method 400 calculates scalar value(s) 207 to be applied to $V_{BATT}$ by buck-boost converter 203 via control circuit 204. Then, at block 409, method 400 applies scalar value(s) 207 to $V_{BATT}$ to generate output voltage(s) 208.

At block 410, if source 306 is subject to dynamically changing states during operation, control returns to block 404 and the source's current or present state is again processed to calculate scalar value(s) 207 at block 408. Similarly, at block 411, if load 307 is subject to dynamically changing states, control returns to block 407 and the load's current or present state is used to calculate scalar value(s) 207 at block 408. Otherwise, method 400 ends at block 412.

Figure 5:
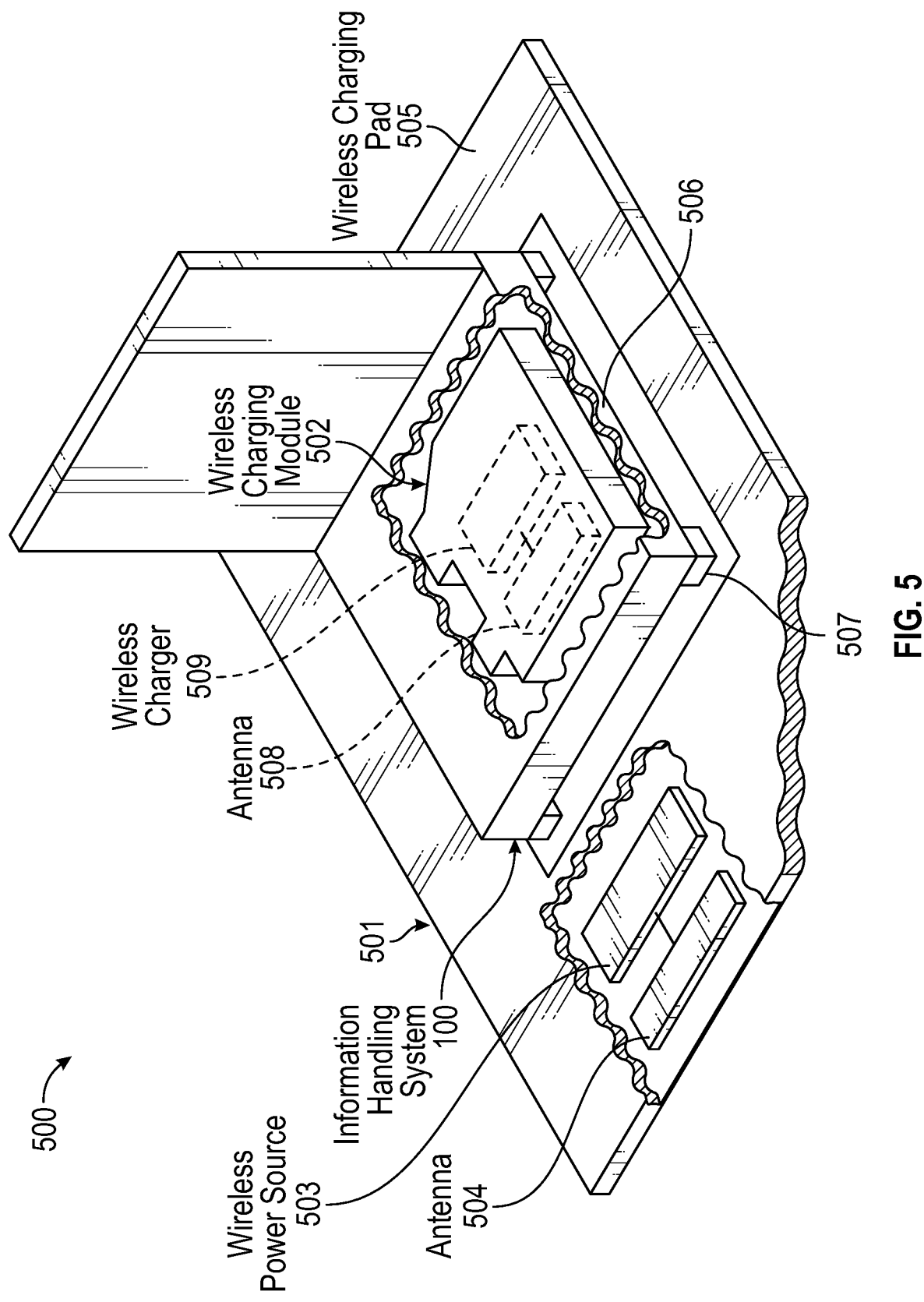
FIG. 5 is a block diagram of a non-limiting example of a wireless power delivery system according to some embodiments.

FIG. 5 is a block diagram of an example of wireless power delivery system 500 according to some embodiments. In some cases, wireless power delivery system 500 may be implemented as charger 306N in FIG. 3. As shown, wireless power delivery system 500 includes wireless charging pad (or "pad") 501 and wireless charging module (or "charger") 502 within IHS 100. Wireless charging pad 501 includes wireless power source 503, antenna(s) or coil(s) 504 (e.g., a single coil or an antenna array), and landing pad 505, whereas wireless charging module 502 includes antenna(s) or coil(s) 508 and wireless charger 509.

Wireless power source 503 is in communication with antenna 504 (which may be located near the center of charging pad 501 but is shown here near the edge for illustration purposes), and which is in communication with antenna 508 of wireless charging module 502. Antenna 508 is in communication with wireless charger 509.

IHS 100 includes chassis 506 and pads 507. In some implementations, wireless charging module 502 may be shaped to fit within a drive bay of IHS 100. Thus, wireless charging module 502 may be inserted into the drive bay and may connect with IHS 100 via one or more buses. For example, wireless charging module 502 may connect with IHS 100 via serial advanced technology attachment (SATA) bus to communicate with IHS 100. Wireless charging module 502 may also provide power to the IHS via a high power connector or the like.

When wireless charging module 502 is connected to IHS 100, wireless charger 509 may communicate with IHS 100 to provide information about wireless charging module 502. For example, information may include a class of the wireless charging module 502, an amount of power that wireless charging module 502 can provide, a type of wireless charging module 502, a maximum amount of voltage that wireless charging module 502 can provide, and the like. IHS 100 may use that information to detect whether wireless charging module 502 is compatible with power system 200 of IHS 100. When IHS 100 has determined that wireless charging module 502 is a compatible charging module, IHS 100 sets power system 200 in a ready state to receive power from wireless charging module 502.

Wireless charging pad 501 may detect when IHS 100 is placed on top landing pad 505, and may transmit a detect signal in response. For example, wireless charging pad 501 may detect IHS 100 when a light sensor on wireless charging pad 501 is covered by IHS 100, by a pressure sensor of wireless charging pad 501 detecting IHS 100, by metal tabs of pads 507 being placed in physical contact with wireless charging pad 501, etc.

IHS 100 may receive the detect signal from wireless charging pad 501, and may respond by transmitting a presence signal. The presence signal may include a repeating pulse signal, referred to as a chirp, and may also include information associated with IHS 100 and wireless charging module 502, such as a class of IHS and the class of the wireless charging module 502. The class of IHS 100 and the class of wireless charging module 502 may indicate a maximum power needed for IHS 100.

In an embodiment, landing pad 505 may be a designated location of wireless charging pad 501 with a specific orientation for IHS 100 so that the antennas 504 and 508 may align properly.

Again, wireless charging pad 501 may receive the presence signal from IHS 100, and may then set an initial power level to be provided from wireless power system 503 to wireless charging module 502. The initial power level may be a minimum power level available from wireless charging pad 501, a maximum power level available from wireless charging pad 501, or any selected power level in between the minimum and maximum power levels. Wireless charging pad 501 may transmit electric power to charger 502 wirelessly via antenna 504.

Wireless charging pad 501 may use one or more techniques to provide power wirelessly, including inductive techniques, resonant inductive techniques, capacitive transfer techniques, beamed power transfer, such as laser or microwave transfer, or the like. For purposes of discussion, however, it is assumed that wireless charging pad 501 transfers power wirelessly using inductive power transfer.

In some cases, a space between antenna 504 and antenna 508 creates an air gap for the inductive power transfer between the two antennas. The amount of power needed to be transferred from antenna 504 to antenna 508 can vary based on the size of the gap, which may be a calculated distance that is determined based on the height of the pads 507, the distance from bottom portion of IHS 100 and the bottom portion of wireless charging module 502, and a distance between antenna 504 and the top of wireless charging pad 501. Antenna 508 of wireless charging module 502 may receive wireless power from antenna 504 and may provide power to wireless charger 509, which in turn converts the power to be used by IHS 100.

IHS 100 may monitor its current operating conditions and determine whether to change a power state of IHS 100. For example, if IHS 100 is receiving the maximum amount of power from wireless charging pad 501 and then IHS 100 enters a lower power mode, IHS 100 can send a power state change signal to wireless charging pad 501 and/or EC 115. The power state change may indicate a new power state for IHS 100.

Wireless charging pad 501 and/or EC 115 may receive the power state change signal and may adjust the power level provided by wireless power system 503 to IHS 100, such that a proper power level is provided to IHS 100 without having excess power that is not used or not having enough power. IHS 100 may continually monitor its operating mode and provide any necessary state change signals to wireless charging pad 501 and/or EC 115.

Figure 6:
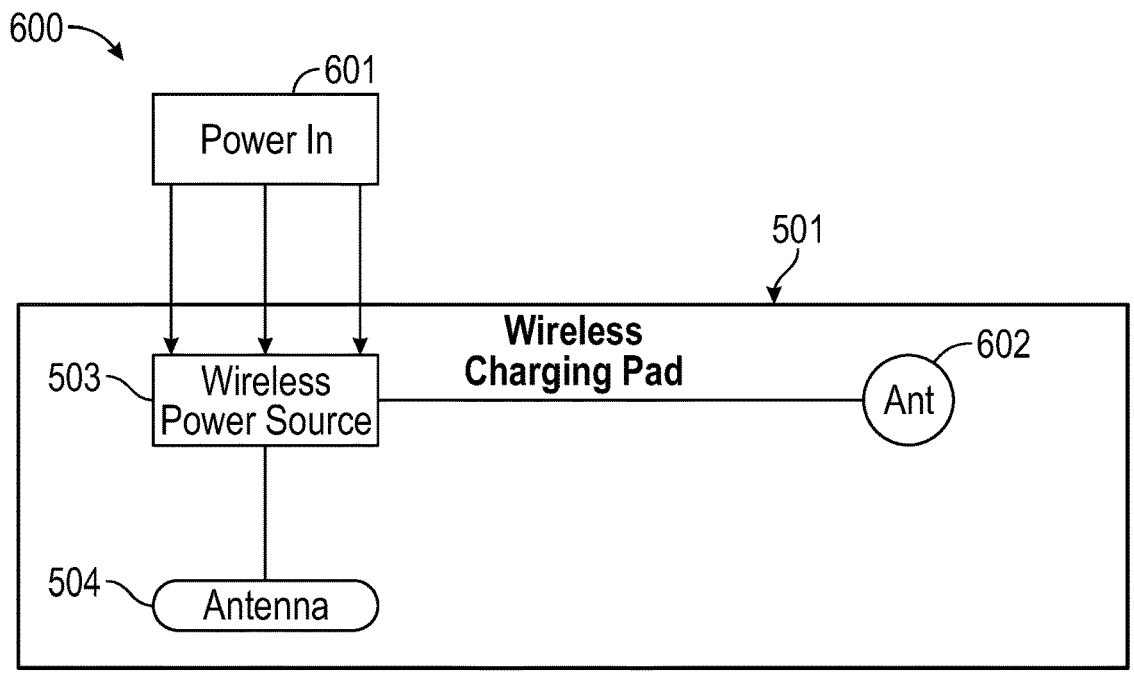
FIG. 6 is a block diagram of a non-limiting examples of components within a wireless power delivery system according to some embodiments.
Figure 6:
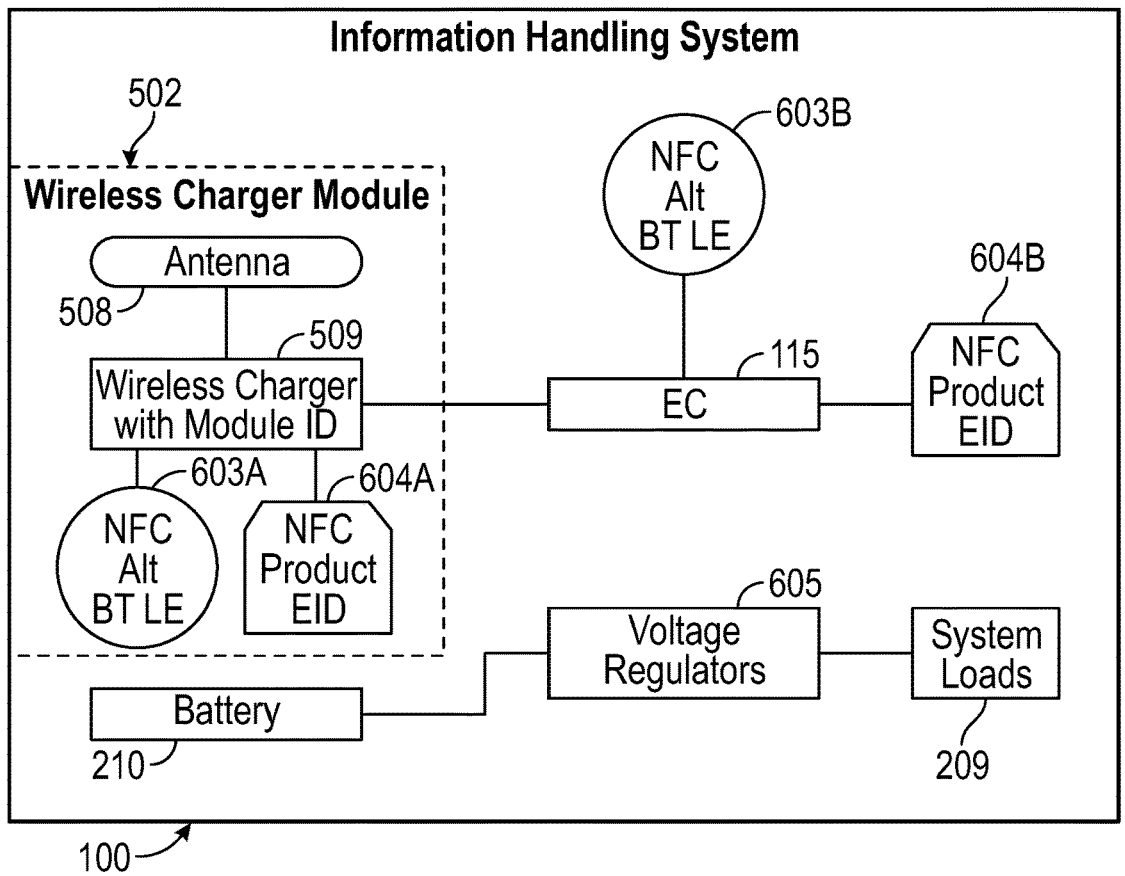

FIG. 6 shows a more detailed embodiment of the wireless power delivery system 500 according to some embodiments. As shown, power-in source 601 may include a DC power source, an AC power source, a universal serial bus (USB) power source, etc. Wireless charging pad 501 is coupled to power-in source 601, and it includes wireless power source 503, antenna or coil 504, and antenna 602 (e.g., a near-field communication (NFC) or Bluetooth Low Energy (BT LE) antenna or the like).

IHS 100 includes wireless charger module 502, battery 210, EC 115, voltage regulators 605, NFC or BT LE antenna 603, and NFC product Electronic Data Identification (EDID) tag 604. Wireless charging module 502 includes antenna or coil 508, wireless charger 509, NFC Alt BT LE antenna 602A, and NFC product EID 604A identifying wireless charger module 502. Antenna 508 is in communication with wireless charger 509, which in turn is in communication with EC 115.

Wireless charger 509 may also be in communication with battery 210 and/or voltage regulator(s) 605 via a power connector or the like. In an embodiment, such a connector may be a system management bus, and it may also include low power pins to provide power to logic components in wireless charging module 502.

EC 115 may be in communication with any other component wiredly or wirelessly coupled thereto, for example, via NFC Alt BT LE antenna 603B. IHS 100 may also includes its own NFC product EID 604A identifying charger 502 and/or IHS 100. Meanwhile, voltage regulators 605 may be configured to provide different regulated voltages to different systems loads (e.g., subsystems 210 and 211) of IHS 100.

In some cases, wireless charging module 502 may communicate with EC 115 to provide information about itself. For example, information can include a class of wireless charging module 502, an amount of power that wireless charging module 502 can provide, a type of wireless charging module 502, or the like. EC 115 may use the information to detect whether wireless charging module 502 is compatible with power system 200 and, if so, it may set power system 200 in a ready state to receive power from wireless charging module 502.

In some implementations, when IHS 100 is placed within a NFC range of wireless charging pad 501, NFC product EDID tag 604 may cause a presence signal to be transmitted via antenna 603 to indicate that IHS 100 is within physical range. The presence signal may be a repeating pulse that can be received by antenna 602, which in turn can provide the presence signal to wireless power source 503. In some implementations, a presence signal from NFC tag 604 may also include information about wireless charging module 502, such as a class of the wireless charging module.

In response to receiving the presence signal, wireless charging pad 501 may set an initial operation level. Wireless power system 503 may then provide power to antenna 504, which in turn can wirelessly provide that power to antenna 508 of wireless charging module 502.

Wireless charging pad 501 may use one or more techniques to provide power wirelessly, including inductive techniques, resonant inductive techniques, capacitive transfer techniques, beamed power transfer, such as laser or microwave transfer, etc. In some embodiments, a plastic portion of wireless charging module 502 and a non-metallic portion 204 of IHS 100 allow power to be provided via inductive power transfer.

Antenna 508 may receive wireless power from the antenna 504, and may provide power to wireless charger 509. Wireless charger 509 may then convert power received from antenna 508 to a power level and a voltage level that can be utilized by IHS 100, such as, for example, 65 W and 19.5 V.

Wireless charger 509 may supply the converted power to battery 210 and/or voltage regulators 605. The power provided to battery 210 may be used to charge the battery, and the power provided to voltage regulators 605 may be supplied at a proper voltage to the remaining components of IHS 100.

EC 115 receives information about the power provided by wireless charging pad 501 from charger 509. The information can include whether wireless charging pad 501 is compatible with the wireless charger 502, a total amount of power that wireless charging pad 501 is able to provide, or the like. EC 115 can also determine information about IHS 100, such as a percentage of battery 210 that is charged, an operation mode of IHS 100, or the like.

If EC 115 determines that wireless charging pad 501 is not compatible with the class of wireless charging module 502, EC 115 can set a flag to cause wireless charger 509 not to receive power from wireless charging pad 501. EC 115 can also notify the user, via a display device, that IHS 100 is not receiving power from wireless charging pad 501.

If EC 115 determines that wireless charging pad 501 is compatible with wireless charging module 502, EC 115 can determine an amount of power that is available from the wireless charging pad. If EC 115 determines that the maximum amount of power available from wireless charging pad 501 is less than the amount needed to operate IHS 100 at maximum power, EC 115 may modify an operating mode of IHS 100, such as operating below the maximum power.

For example, EC 115 can cause IHS 100 to enter a standby or low power mode in response to determining that the maximum amount of power available from wireless charging pad 501 is substantially less than the amount needed by IHS 100. EC 115 may cause IHS 100 to remain in the low power mode while battery 210 is charged to a high enough capacity to operate IHS 100. In another embodiment, EC 115 may reduce the operational mode of IHS 100, such that the voltage supplied to the central processing unit, the memory, and other components of IHS 100 is reduced.

If EC 115 determines that wireless charging pad 501 can provide more power than needed by IHS 100 for maximum operation power, EC 115 may determine a power state needed for IHS 100. When EC 115 receives the power state from EC 115, it can determine an operation level for wireless charging pad 501. EC 115 may then send the operation level to wireless power source 503, which in turn can determine an amount of power to be provided.

While wireless charging module 502 is receiving power from wireless charging pad 501, EC 115 may continually monitor the operational mode of IHS 100 and adjust the power state or mode. For example, IHS 100 may operate in a maximum power mode and may switch to a low power mode such that IHS 100 does not need the same amount of power. The power state can indicate the amount of power to be provided to wireless charging module 502 connected IHS 100. In this situation, EC 115 may determine a new power state and it may adjust the operation level of wireless charging pad 501. The change in the operation level of wireless charging pad 501 may result in a change in the amount of power provided to IHS 100.

If wireless charging pad 501 cannot provide the amount of power requested by EC 115 or any amount of power to IHS 100, wireless charging pad 501 can send information to EC 115 to indicate the current power available. EC 115 can then set a flag to indicate that a certain amount of power cannot be received from wireless charging pad 501. EC 115 may also set a flag when battery 210 is fully charged, and another flag when battery 210 is fully charged. EC 115 may then indicate that IHS 100 does not currently need power from wireless charging pad 501.

When IHS 100 and wireless charging module 502 are no longer in communication with wireless charging pad 501, EC 115 can clear any flags set. Thus, if IHS 100 begins to communicate with wireless charging pad 501 again, the communication and setup between EC 115 and wireless charging pad 501 can restart. In another embodiment, when IHS 100 is no longer in communication with wireless charging pad 501, EC 115 can continue to maintain flags (e.g., indicating that battery 210 is fully charged).

In various embodiments, systems and methods described herein may be implemented, for example, to provide wireless charging with optimized wireless power flux boost and load point efficiency in IHS 100. Generally, wireless charging is impacted by the voltage used to create the flux, as well as winding ratio (i.e., thickness). This can limit power transfer as higher winding count is thicker (Z), and the flux formed can be so weak as to not couple well (poor efficiency). Component overheating follows, limiting practical wireless charging applications.

Using systems and methods described herein, however, by multiplying the input voltage by a scalar factor, a high quality flux may be formed in a small coil shape. The flux may the received at a high voltage and/or keeps the coil ratio at or near 1:1 (small and low loss). The voltage is then divided down using a factor to counter the boost, thus keeping the DC input and output voltages at similar levels at the end point for cost, regulatory, human factors, etc.

In some cases, a first buck-boost converter may be provided in wireless charging pad 501 (boost), and a second buck-boost converter may be provided in wireless charging module 502 (buck). However, the use of buck-boost converters can still result in an 8-10% loss per stage—i.e., the boosting on transmitter side is responsible for an 8% loss, and the bucking on receiver side is responsible for another 8% loss.

As an alternative to using buck-boost converters, systems and methods described herein may employ a voltage multiplier circuit and voltage divider circuit. A multiplier circuit results in a 2% loss, and so does a divider circuit 705, for a total of 4% power loss (versus a 16% loss when buck-boost converters are used).

On the transmitting side, a voltage multiplier may be an electrical circuit that converts AC or DC electrical power from a lower voltage to a higher DC voltage, typically using a network of capacitors and diodes. One type of voltage multiplier is a half-wave series multiplier, also referred to as the Villard cascade. However, many other types of multipliers may also be used, including, for example, transformer-based multipliers with selectable taps.

On the receiving side, a voltage divider may be a passive linear circuit that produces an output voltage that is a fraction of its input voltage, as result of distributing the input voltage among the components of the divider—typically resistors and capacitors. Again, using a voltage multiplier in pad 501 and voltage divider 705 in charger 502, instead of buck-boost converters, may yield additional power savings.

Figure 7:
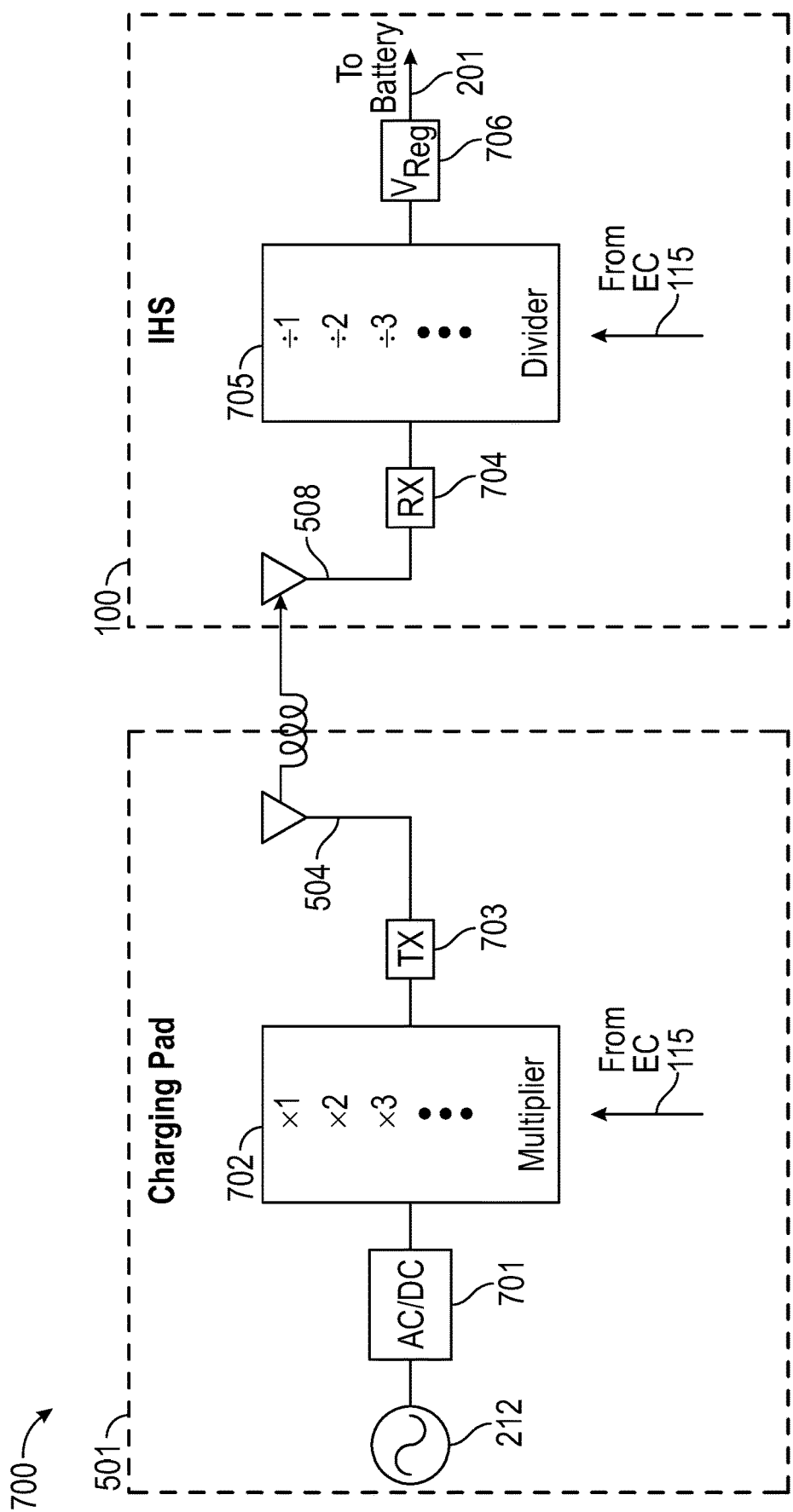
FIG. 7 is a block diagram of a non-limiting example of a wireless power delivery system with optimized wireless power flux boost and load point efficiency according to some embodiments.

FIG. 7 is a block diagram of a non-limiting example of a wireless power delivery system with optimized wireless power flux boost with optimal load point efficiency 700, according to some embodiments. As shown, charging pad 501 includes AC source 212 (VAC), AC/DC converter 701, voltage multiplier 702, transmitter circuit (Tx) 703, and coil or antenna 504. Moreover, IHS 100 includes coil or antenna 508, receiver circuit (Rx) 704, voltage divider 705, and voltage regulator 706, which provides a regulated output voltage to battery 210.

In operation, EC 115 may control scalar factors to be applied to voltage multiplier 702 and voltage divider 705 in order to provide wireless charging with optimized wireless power flux boost and load point efficiency. Scalar factors for voltage multiplier 702 and voltage divider 705 may be determined based upon the identified characteristics of pad 501 and/or module 502, as well as characteristics of battery 210, high-voltage subsystem 210, low-voltage subsystem 211, and/or their present operating states.

Figure 8:
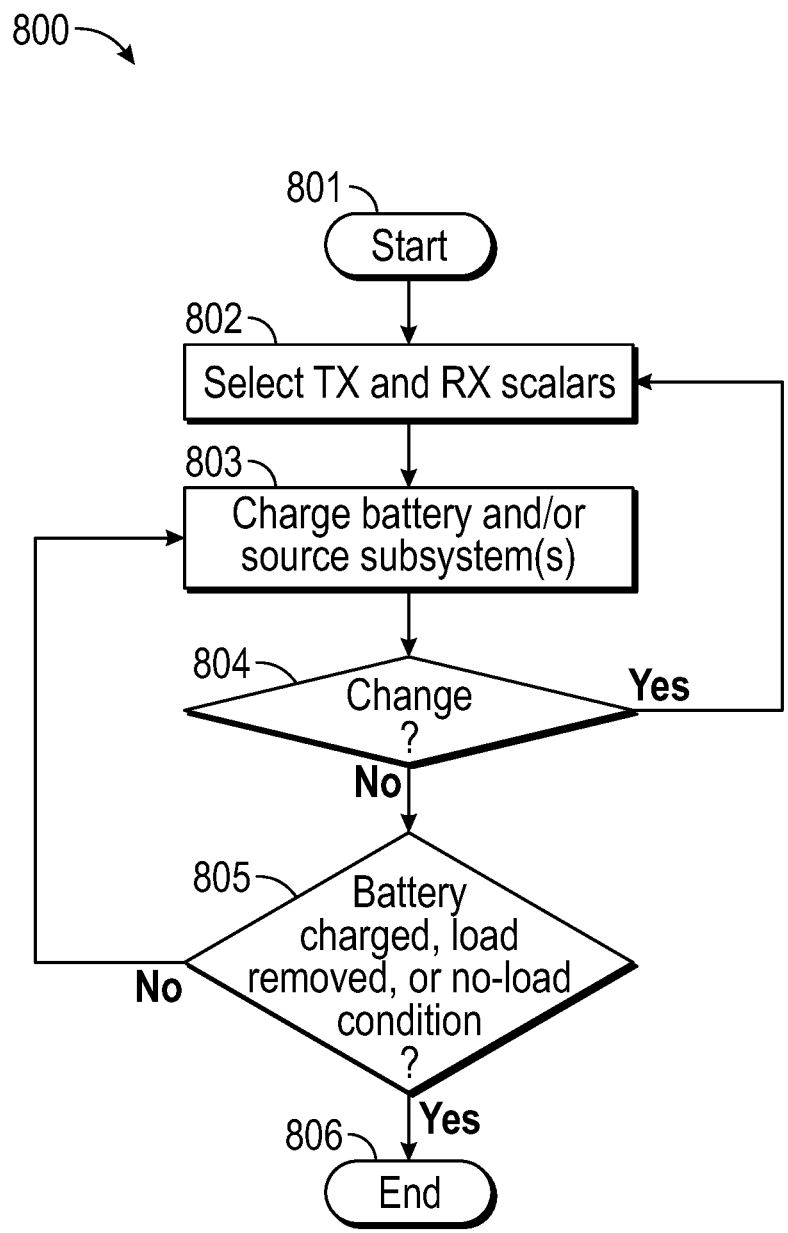
FIG. 8 is a flowchart of a non-limiting example of a method for wireless power delivery with optimized wireless power flux boost and load point efficiency according to some embodiments.

FIG. 8 is a flowchart of a non-limiting example of method 800 for wireless power delivery with optimized wireless power flux boost and load point efficiency according to some embodiments. Method 800 starts at block 801. At block 802, method 800 selects a first scalar to be applied to multiplier circuit 702, and a second scalar to be applied to divider circuit 705. In many cases, the second scalar may be the inverse of the first scalar. The initial value(s) may be negotiated between pad 501 and charger 502 as part of a handshake produce or the like (scalar matching, device interrogation, etc.)

Particularly, EC 115 may receive or derive information regarding charging pad 501. Then, EC 115 may select the first scalar value based upon that information. For example, EC 115 may identify wireless charging pad 501 by receiving identification information from pad 501 (and/or charger 502), by retrieving a power resource specification of that subsystem from an Advanced Configuration and Power Interface (ACPI) table. Additionally or alternatively, EC 115 may perform an electrical characterization of wireless charging pad 501 and/or component(s) thereof. Additional information/characteristics may include a minimum or maximum amount of power deliverable by charging pad 501.

Additionally or alternatively, EC 115 may receive information regarding charger 502. In this case, information/characteristics may include a minimum or maximum amount of power receivable by charger 502. Accordingly, the first scalar value may be selected to reduce a power mismatch (increase the power flux) between charging pad 501 and charger 502 based upon the amount of receivable and/or deliverable power.

Additionally or alternatively, EC 115 may receive information regarding battery 201. In this case, information/characteristics may include a charge level, a charge rate, or a discharge rate of battery 201. Accordingly, the first scalar value may be selected to reduce a power mismatch (increase the power flux) between charging pad 501 and charger 502 based upon the charge level, charge rate, or discharge rate of battery 201.

Additionally or alternatively, EC 115 may receive information regarding load within IHS 100. In this case, information/characteristics may include a power requirement of the load and/or an operational state of the load. Accordingly, the first scalar value may be selected to reduce a power mismatch (increase the power flux) between charging pad 501 and charger 502 based upon the power requirement of the load and/or an operational state of the load.

Additionally or alternatively, EC 115 may determine a number of IHS 100 conditions, such as, for example, the temperature of one or more components (e.g., a processor core), Operating System conditions (e.g., pending turbo requests), BIOS conditions (e.g., upcoming turbo window), and battery conditions (e.g., amount of charge stored). Then, EC 115 may select the first scalar value to reduce a power mismatch (increase the power flux) between charging pad 501 and charger 502 based upon the IHS conditions.

In many implementations, relationships between these various characteristics and the wireless power transfer mismatch reduction may be quantified using any suitable electrical characterization and/or empirical technique. For example a learning algorithm may identify optimal scalar values to minimize the mismatch and increase efficiency during operation of the IHS, as one or more of characteristics changes over time (e.g., battery 201 charges or discharges, and the IHS' load(s) varies, the relative positions between antennas or coils 504 and 508 changes), thus requiring more or less power, in order to "right-size" (that is, 1:1) the wireless electrical power transfer between pad 501 and charger 502. These relationships may be stored in database 302, in the form of a table or the like, and used during runtime (e.g., in other instances of the same IHS 100).

At block 803, method 800 proceeds to charge battery 201 and/or to provide power directly to other components of IHS 100, such as high-voltage subsystem 210 and low-voltage subsystem 211. If any of the aforementioned characteristics of battery 201, high-voltage subsystem 210, low-voltage subsystem 211, and/or their present operating states changes at block 804, control returns to block 802, where EC 115 selects new scalar values. If there are no changes at block 804, block 805 determines whether battery 201 is charged, whether the load has been removed, or whether a no-load condition has been detected. If so, method 800 ends at block 806. Otherwise, control returns to block 803.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
an embedded controller (EC);
a battery;
a wireless charging unit configured to charge the battery using a wireless power transmission from a charging pad; and
a memory coupled to the EC, the memory having program instructions stored thereon that, upon execution, cause the EC to:
determine a first characteristic of the charging pad configured to provide the wireless power;
select, based upon the first characteristic, a first scalar value for modifying the wireless power transmission by the charging pad;
transmitting the scalar value to the charging pad, wherein the scalar value is applied to a voltage multiplier of the charging pad to modify the wireless power transmission by the charging pad; and
select a second scalar value for converting the received wireless power transmission to an output voltage used to charge the battery, wherein the second scalar value is applied to a voltage divider to convert the received wireless power transmission, and wherein the second scalar value comprises an inverse of the first scalar value.

2. The IHS of claim 1, wherein to determine the first characteristic, the program instructions, upon execution, cause the EC to identify the charging pad.

3. The IHS of claim 1, wherein the first characteristic includes a minimum or maximum amount of power deliverable by the charging pad, and wherein the first scalar value is selected to reduce a power mismatch between the charging pad and the wireless charging unit.

4. The IHS of claim 1, wherein the program instructions, upon execution, cause the EC to determine a characteristic of the battery, and wherein the first and second scalars are selected based upon the first characteristic and further based on the battery characteristic.

5. The IHS of claim 4, wherein the battery characteristic comprises a charge level, a charge rate, or a discharge rate.

6. The IHS of claim 4, wherein the program instructions, upon execution, cause the EC to determine a characteristic of an electrical load of the IHS, and wherein the first and second scalars are selected based upon the first characteristic, the battery characteristic and the load characteristic.

7. The IHS of claim 6, wherein the battery characteristic includes an operating state of the load.

8. A hardware memory storage device having program instructions stored thereon that, upon execution by an embedded controller (EC) of an information handling system (IHS), cause the EC to:
determine a first characteristic of a charging pad configured to provide a wireless power transmission to a wireless charging unit of the IHS;
select, based upon the first characteristic, a first scalar value for modifying the wireless power transmission by the charging pad;
transmit the scalar value to the charging pad, where the scalar value is applied to a voltage multiplier of the charging pad to modify the wireless power transmission by the charging pad; and
select a second scalar value for converting the received wireless power transmission to an output voltage used to charge a battery of the IHS, wherein the second scalar value is applied to a voltage divider to convert the received wireless power transmission, wherein the second scalar value comprises an inverse of the first scalar value.

9. The hardware memory storage device of claim 8, wherein the first characteristic includes a minimum or maximum amount of power deliverable by the charging pad, and wherein the first scalar value is selected based upon a minimum or maximum amount of power deliverable by the charging pad to reduce a power mismatch between the charging pad and the wireless charging unit.

10. The hardware memory storage device of claim 8, wherein the first characteristic includes a minimum or maximum amount of power receivable from the charging pad, and wherein the first scalar value is selected based upon the minimum or maximum amount of power receivable from the charging pad to reduce a power mismatch between the charging pad and the wireless charging unit.

11. The hardware memory storage device of claim 8, wherein the program instructions, upon execution, further cause the EC to determine a charge level, a charge rate, or a discharge rate of the battery, wherein the first scalar value is selected based upon the charge level, charge rate, or discharge rate.

12. The hardware memory storage device of claim 11, wherein the program instructions, upon execution, further cause the EC to determine a power requirement of a load within the IHS, wherein the first scalar value is selected based upon the power requirement.

13. The hardware memory storage device of claim 12, wherein the program instructions, upon execution, further cause the EC to determine an operating state of a load within the IHS, wherein the first scalar value is selected based upon the operating state.

14. A method for charging an Information Handling System (IHS), comprising:
determine a first characteristic of a charging pad configured to transmit wireless power to a charger coupled to a battery of the IHS;
select, based upon the first characteristic, a first scalar value for modifying the wireless power transmitted by the charging pad;
transmit the scalar value to the charging pad, where the scalar value is applied to a voltage multiplier of the charging pad to modify the wireless power transmitted by the charging pad; and
select a second scalar value for converting the wireless power received from the charging pad to an output voltage used by the charger, wherein the second scalar value is applied to a voltage divider of the charger, wherein the second scalar value comprises an inverse of the first scalar value.

15. The method of claim 14, wherein the first characteristic includes a minimum or maximum amount of power deliverable by the charging pad, and wherein the first scalar value is selected based upon based upon the minimum or maximum amount of power to reduce a power mismatch between the charging pad and the charger.

16. The method of claim 14, wherein the first characteristic includes a minimum or maximum amount of power receivable from the charger pad, and wherein the first scalar value is selected based upon based upon the minimum or maximum amount of power to reduce a power mismatch between the charging pad and the charger.

17. The method of claim 14, further comprising determining a charge level, a charge rate, or a discharge rate of the battery, wherein the first scalar value is selected based upon the charge level, charge rate, or discharge rate.

18. The method of claim 14, further comprising determining a power requirement of a load within the IHS, wherein the first scalar value is selected based upon the power requirement.

19. The method of claim 14, wherein the program instructions, upon execution, cause the EC to determine an operating state of a load within the IHS, wherein the first scalar value is selected based upon the operating state.

\* \* \* \* \*